United States Patent
Reiss, Jr.

(10) Patent No.: US 7,919,003 B2
(45) Date of Patent: Apr. 5, 2011

(54) PROTECTIVE SLEEVE FOR INTAKE RACK BARS

(75) Inventor: Thomas J. Reiss, Jr., Ixonia, WI (US)

(73) Assignee: Hydro Component Systems, LLC, Watertown, WI (US)

(*) Notice: Subject to any disclaimer, the term of this patent is extended or adjusted under 35 U.S.C. 154(b) by 1137 days.

(21) Appl. No.: 11/488,461

(22) Filed: Jul. 18, 2006

(65) Prior Publication Data

US 2007/0125691 A1 Jun. 7, 2007

Related U.S. Application Data

(60) Provisional application No. 60/700,682, filed on Jul. 19, 2005.

(51) Int. Cl.
*E03F 5/14* (2006.01)

(52) U.S. Cl. ......... 210/767; 210/159; 210/162; 210/541

(58) Field of Classification Search .................. 210/767, 210/791, 159, 162, 413, 499, 541, 542
See application file for complete search history.

(56) References Cited

U.S. PATENT DOCUMENTS

| | | | | |
|---|---|---|---|---|
| 2,839,197 | A | * | 6/1958 | Nordell .................... 210/499 |
| 2,930,485 | A | * | 3/1960 | Nordell .................... 210/158 |
| 3,193,104 | A | | 7/1965 | Leach |
| 3,482,698 | A | | 12/1969 | Ostnas |
| 3,657,119 | A | * | 4/1972 | Turbeville ................ 210/680 |
| 3,909,411 | A | | 9/1975 | Angele et al. |
| 4,218,319 | A | | 8/1980 | Hansson |
| 4,447,323 | A | | 5/1984 | Jackson |
| 4,792,394 | A | | 12/1988 | Rudzinski |
| 4,846,966 | A | | 7/1989 | Pastore |
| 4,857,182 | A | | 8/1989 | Jackson |
| 4,982,471 | A | * | 1/1991 | Bannan .................... 15/105 |
| 5,074,996 | A | | 12/1991 | Galanty et al. |
| 5,098,561 | A | | 3/1992 | Grabbe |
| 5,167,803 | A | | 12/1992 | Newton et al. |
| 5,246,573 | A | | 9/1993 | Lodholz et al. |
| 5,534,140 | A | * | 7/1996 | Brummond et al. ......... 210/106 |
| 5,571,406 | A | | 11/1996 | Mensching |
| 5,718,771 | A | | 2/1998 | Cassell et al. |
| 5,968,350 | A | | 10/1999 | Davignon |
| 6,016,920 | A | | 1/2000 | Brauch et al. |
| 6,129,215 | A | | 10/2000 | Brauch et al. |
| 2007/0125691 | A1 | * | 6/2007 | Reiss, Jr. ................. 210/159 |

OTHER PUBLICATIONS

Hydro Component Systems, LLC, Racks, printed from http://hydrocomponentsystems.com/racks.htm on Jul. 19, 2005, Watertown, Wisconsin.

* cited by examiner

*Primary Examiner* — Christopher Upton

(74) *Attorney, Agent, or Firm* — Reinhart Boerner Van Deuren s.c.

(57) ABSTRACT

A protective sleeve for use with metal intake racks used for screening debris from water intakes and other similar structures. The proactive sleeve may be made from a plastic material, such as HDPE, using an extrusion process. The sleeve is designed to snap into place over the metal blades of a bar rack, and to provide a positive and secure fit when in place. The protective sleeve thus provides the benefits of non-metallic intake racks to existing and future metal rack systems, without requiring replacement of existing metal racks.

16 Claims, 2 Drawing Sheets

PROTECTIVE SLEEVE FOR INTAKE RACK BARS

This application claims the benefit of U.S. Provisional Patent Application No. 60/700,682, filed on Jul. 19, 2005.

FIELD OF THE INVENTION

This invention pertains generally to intake screens or racks that are used to prevent debris from entering into systems and facilities that intake water from exposed above-ground water sources such as rivers, lakes, oceans and the like.

BACKGROUND OF THE INVENTION

Various systems and facilities intake large quantities of water from various exposed natural and other above-ground water sources, such as rivers, lakes, oceans, reservoirs, irrigation and flood water canals, outdoor water parks, other water conveyance structures, and the like. Examples of such systems and facilities include hydroelectric plants, pulp and paper mills, steel mills, petro-chemical plants, municipal water systems and waste water plants, nuclear and other energy facilities that use the water for cooling or for other purposes, other water filtering or screening facilities or systems, etc. In all such systems it is important to screen naturally occurring debris found in the exposed above-ground water source from the flow of water that is taken into and employed by the system or facility. Such debris may include, for example, leaves, branches, and other portions of trees or other plants that have fallen into or grown in the water source, trash, and other debris that has been dumped or otherwise found its way into the exposed above-ground water source, etc. Such debris could cause significant damage to the system or facility obtaining water from the exposed above-ground water source if it were allowed to enter into the system or facility.

Various screening systems are known and used for preventing debris found in exposed above-ground water sources from entering into the systems or facilities described above. For example, fine mesh screening may be used to exclude even small pieces of debris from such systems. Screening systems with larger openings may be used, either alone or in combination with finer screening, to prevent large debris from entering the system or facility taking water from the exposed above-ground water source. Such larger opening screening systems may be used for preventing large debris from reaching finer mesh screening positioned downstream from the larger opening screening. Larger opening screening systems preferably do not dramatically adversely affect the water flow volume provided into the facility or system through the screening system.

An exemplary screening system of this type is known as an intake rack system or trash rack. Intake rack systems typically provide screening using a series of vertically oriented parallel blades or bars separated by spacers and mounted on horizontally oriented rods. The spacing between the blades forming the intake rack is selected to screen debris of the desired size from entering the water intake of the system or facility that the trash rack is protecting, without significantly reducing water flow into the water intake. Such intake racks may be made of metallic or non-metallic materials. Intake racks of this type are available, for example, from Hydro Component Systems, LLC of Watertown, Wis.

In a typical application, intake racks of this type may be mounted upstream from the water intake of a hydroelectric or other plant, system or facility that intakes water from a river or other similar exposed above-ground water source. The elongated vertically oriented parallel blades forming the intake rack extend downward into the water to prevent debris floating at the water surface or in the water below the water line from entering the system or facility. Various tools have been developed for cleaning accumulated debris from intake racks and similar screening systems. An example of such a tool is the Trash Rake System for Clearing Intake Racks and the Like described in U.S. patent application Ser. No. 11/144,393 filed on Jun. 3, 2005, the disclosure of which is incorporated herein by reference.

The leading edges of intake rack blades or bars, that is, the edges of the blades or bars that first contact water and debris flowing through and against the intake rack, may be formed to have curved edges. This has several advantages. Curved leading edges facilitate better water flow through the intake rack. Curved leading edges on the intake rack blades or bars also present less surface area over which a trash rake or other device must slide when cleaning debris from the intake rack. Less surface area means less friction, and less energy is thus required to move the trash rake or other device across the intake rack during a debris cleaning operation.

As mentioned above, intake rack systems may be made of metallic or non-metallic materials. For example, the vertical blades of an intake rack may be made of a durable plastic material, such as HDPE, or of a metal material, such as cold rolled steel.

Intake racks with metal rack blades or bars are the most commonly used. Such racks are very strong, and thus can withstand impacts from large debris and other incidental contacts without being seriously damaged in most cases. However, intake racks with rack blades made from metals, such as steel, also suffer from several significant limitations. Metal racks will rust unless treated with an epoxy coating. In cold weather the metal rack blades can conduct a freezing air temperature into the water, causing ice to form on the rack blades. This ice acts as an insulator, allowing the metal rack blades to conduct the cold temperatures deeper into the water to continue the freezing process. As ice forms on the rack blades in this manner the flow of water through the intake rack is restricted.

Plastic intake racks do not suffer from many of the limitations of metal racks. Plastic racks do not rust or corrode, and thus are the preferred solution for salt water applications in particular. Plastic racks don't transfer below freezing air temperatures into the water, and thus reduced water flow through the rack due to ice formation on the rack blades is eliminated. Marine growth, another potential cause of reduced water flow through an intake rack, also is less prevalent in plastic intake rack systems. Marine growth does not stick to plastic as well as it does to coated steel intake racks.

Given the many advantages of plastic intake racks, plastic racks are often a preferable solution. However, many facilities already have metal intake rack systems in place. To replace such installed metal rack systems with plastic racks would be an expensive undertaking.

What is desired is an intake rack system that combines the advantages of existing metal and plastic rack systems. What is desired, in particular, is an apparatus and method for bringing the advantages of plastic intake rack systems to existing metal rack system installations in an inexpensive manner that does not require removal, replacement, or reinstallation of the existing metal rack systems.

SUMMARY OF THE INVENTION

The present invention provides a protective sleeve for the vertical metal bars forming the blades of a metal intake or trash rack system. A protective sleeve in accordance with the present invention is made of a plastic material, is easily attached to the blades of an existing metal rack system without removing the existing system, and imparts to existing metal rack system many of the advantages of plastic intake rack systems. A protective sleeve in accordance with the presenting invention may be used on the metal bars or blades of intake racks and other similar structures used for screening debris from water intakes positioned in natural or man-made exposed above-ground water sources. A protective sleeve for bar racks in accordance with the present invention may be used in combination with various different water intake screening systems such as trash racks, intake screens, cooling water screens, storm water overflows, culvert and drainage underflows, headworks, and flow straighteners, as used in applications such as hydroelectric and other power plants, cooling towers for nuclear energy and other power plants and other facilities, pulp and paper mills, steel mills, petro-chemical plants, municipal water and/or waste water plants, fish diversions, other water filtering and/or screening facilities or systems, etc.

A protective sleeve in accordance with the present invention may be manufactured using a conventional extrusion process from a plastic material such as HDPE. A protective sleeve in accordance with the present invention may be manufactured in this manner to any desired length and other dimensions so as to fit over the metal bar blades of existing and future metal intake rack systems. Protective sleeves in accordance with the present invention preferably are designed to snap in place over the metal bars of conventional metal rack systems and to provide a positive and secure fit when in place. Protective sleeves in accordance with the present invention are thus easily replaceable when needed.

Further objects, features, and advantages of the invention will be apparent from the following detailed description taken in conjunction with the accompanying drawings.

DETAILED DESCRIPTION OF THE INVENTION

The present invention provides a protective sleeve for use with the metal blades of intake racks, an intake rack system employing such protective sleeves, and a method of employing such protective sleeves with existing in-place metal intake racks to provide the benefits of a non-metallic rack without requiring replacement of the metal rack. Protective sleeves in accordance with the present invention may be used with intake racks as well as other similar systems and structures. For example, protective sleeves in accordance with the present invention may be used with a variety of metal intake screens, cooling water screens, storm water overflow screening structures, culvert and drainage underflow screening structures, headworks, and flow straighteners, etc. Such intake racks and similar structures may used in association with hydroelectric or other power plants, intake ducts for nuclear energy or other facility cooling water, pulp and paper mills, steel mills, petrochemical plants, municipal water and/or waste water treatment plants, fish diversions, and other water filtering or screening facilities or systems, etc. Such systems and facilities may be located in any natural or man-made exposed above-ground water source, such as rivers, lakes, oceans, reservoirs, irrigation and flood water canals, water parks, and other water conveyance structures, etc. in which any variety or type of natural or man-made debris may be found that is to be screened by the intake rack screening system or structure.

Figure 2:
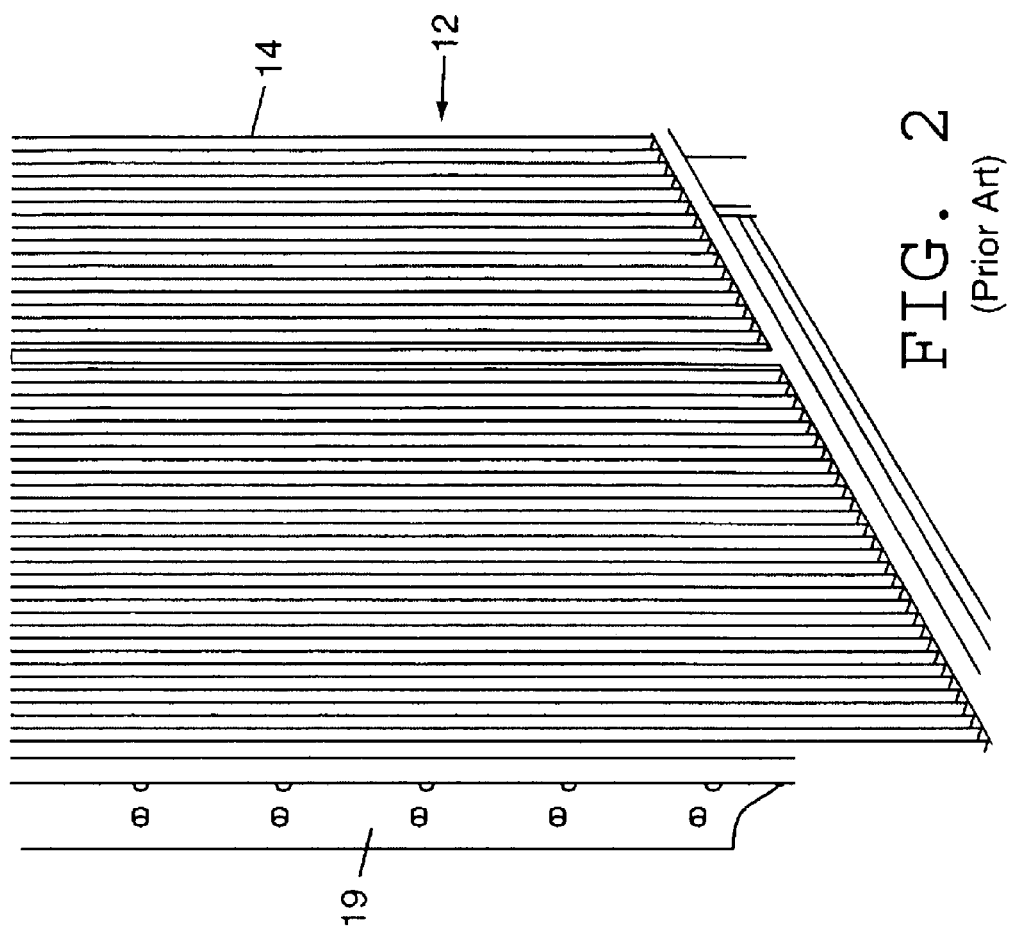
FIG. 2 is a perspective view of a larger portion of an intake rack system having metal blades unto which protective sleeves in accordance with the present invention may be mounted.
Figure 1:
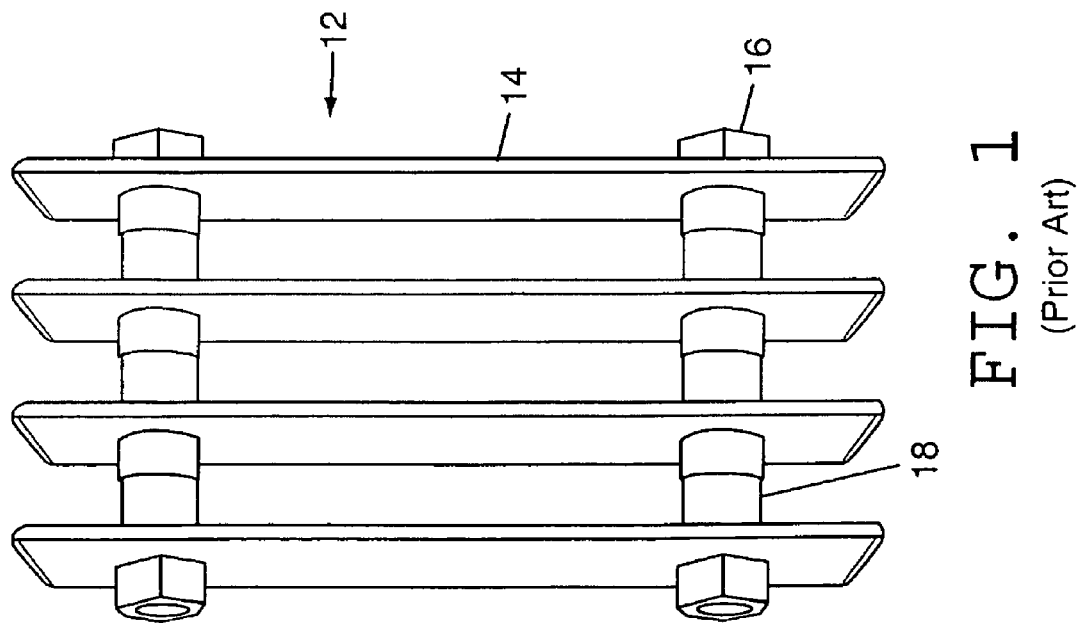
FIG. 1 perspective view in detail of a portion of a known plastic intake rack system.

As illustrated in FIGS. 1 and 2, a typical intake trash rack 12 is formed of a series of spaced apart blades 14. The vertical blades 14 are mounted on horizontal support structures 16, such as horizontal rods or similar structures. Spacers 18, typically also mounted on the horizontal support structures 16, provide the desired separation between the blades 14. The vertical blades 14 and the horizontal support structures 16 may be mounted together in an appropriate frame 19 to form the complete trash rack structure 12. (For example, the ends of the horizontal support structures 16 may be bolted as otherwise secured to the frame 19.)

A portion of a trash intake rack 12 made of a plastic material is illustrated in FIG. 1. Such an intake rack 12 may have blades 14 and spacers 18 made of various plastic materials using various manufacturing processes. For example, such an intake rack may have blades and spacers made of extruded HDPE or some other material or by some other processes. The horizontal support structures 16 upon which the blades 14 and spacers 18 are mounted may similarly be made of a plastic (e.g. solid pultruded FPR) or another appropriate material. The leading and trailing edges of the rack blades 14 may be curved or flat. As discussed above, such curved edges facilitate water flow through the rack 12 as well as reduce the effect required to clear debris from the rack 12. As discussed above, plastic intake racks 12 of the type illustrated in FIG. 1 have many advantages including no corrosion, resistance to ice build up, light weight, and resistance to fouling by marine life. Plastic racks 12 of the type illustrated in FIG. 1 are available, for example, from Hydro Component Systems LLC of Watertown, Wis.

A conventional trash intake rack 12 having metal (e.g., steel) blades 14 is illustrated in FIG. 2. In this case, and as is typical, the rack blades 14 are generally bar shaped, i.e., the blades 14 are generally rectangular in cross section. (The terms "rack blades", "rack bars," and similar terms are used interchangeably herein as well as in the accompanying claims.) Although providing a high strength trash intake rack 12, a trash intake rack 12 having metal bar blades 14 has several limitations, as discussed above.

In operation, the intake trash rack 12 is positioned such that the parallel blades 14 extend downward substantially vertically into a water source, e.g., a river. A water intake, e.g., for a hydroelectric plant or other system or facility, is positioned approximately directly behind, e.g., downstream from, the intake rack 12. Thus, water flowing downstream is allowed to enter the water intake through the spaces formed between the vertical blades 14 forming the intake rack 12. (Note that additional finer screening of debris also may be provided between the intake rack 12 and the system or facility water intake.) Natural or man-made debris flowing downstream, however, is prevented from entering the water intake by the blades 14 of the intake rack 12. Such debris captured by the intake rack 12 will tend to accumulate on the surface of the rack 12, typically at or slightly below the water line, and can be removed therefrom using a variety of different systems and methods, such as using the Trash Rake System for Clearing Intake Racks and the Like described in U.S. patent application Ser. No. 11/144,393, filed on Jun. 3, 2005.

Figure 4:
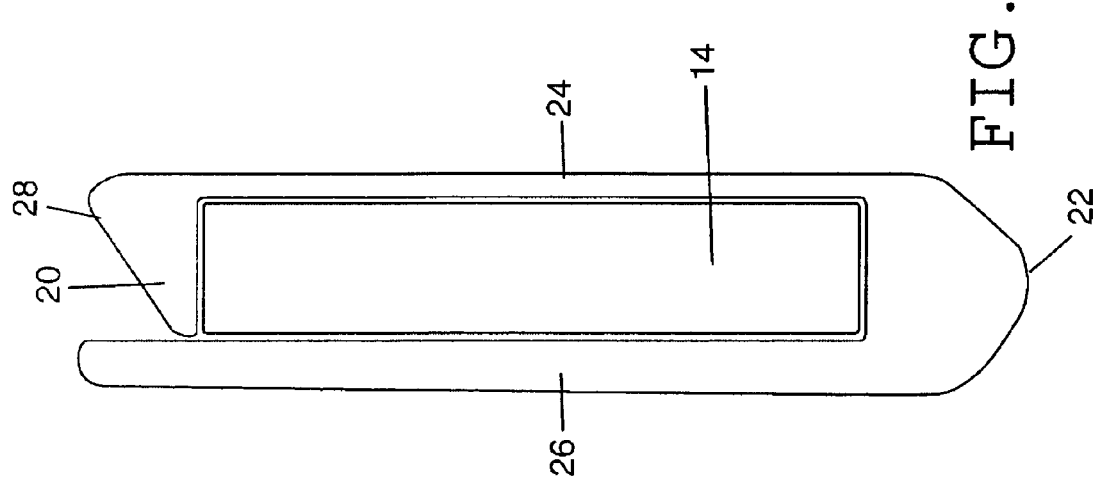
FIG. 4 is a cross sectional view of the exemplary protective sleeve in accordance with the present invention and metal intake rack blade as taken along the line 4-4 of FIG. 3.
Figure 3:
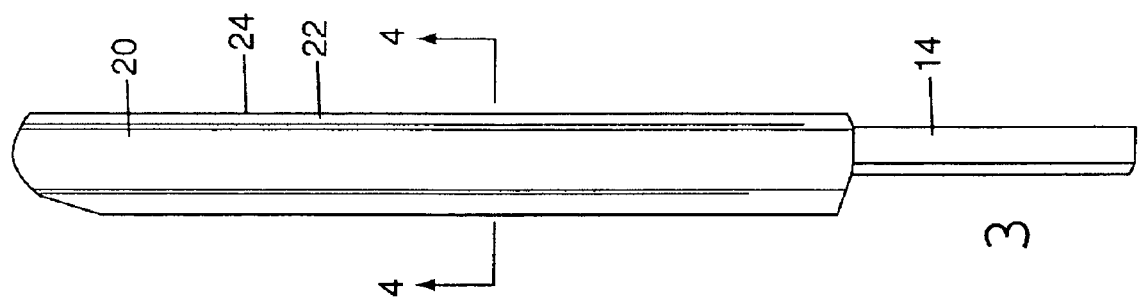
FIG. 3 is a leading edge view of a portion of an exemplary protective sleeve in accordance with the present invention as mounted on a portion of a metal intake rack blade.

A protective sleeve 20 in accordance with the present invention, as mounted on a metal intake rack blade 14, is illustrated in, and will be described in detail with reference to, FIGS. 3 and 4. The metal rack blade 14 may be made, for example, of cold rolled steel, or some other similar metallic material and has for example, a rectangular cross sectional shape, and may be of almost any desired length appropriate for the intake rack system 12 in which the blade 14 is used.

An exemplary protective sleeve 20 in accordance with the present invention has four sides that preferably completely or substantially surround the metal intake rack blade 14 when positioned thereon. The four sides include a leading side 22, two elongated side walls 24 and 26, and a trailing side 28.

The leading side 22 of the protective sleeve 20 is that side thereof against which water will flow and debris will accumulate when the sleeve is in use in position an intake rack blade 14. The leading side 22 of the protective sleeve 20 preferably may be made of thicker material than, for example, the side walls 24 and 26 of the sleeve 20. Thus, the leading side 22 of the sleeve 20 is better able to withstand the impact of debris and incidental contact thereon. The outer surface of the leading side 22 of the sleeve 20 preferably may be curved to provide a radiused leading edge to the intake rack blade 14 when mounted in position thereon The side walls 24 and 26 extend backward in the same direction from the leading side 22 of the protective sleeve 20. The side walls 24 and 26 of the sleeve preferably may be made of the same material as the leading side 22, but are thinner, such that the side walls 24 and 26 are somewhat flexible.

The trailing side 28 of the protective sleeve 20 preferably is formed to have a structure that facilitates mounting the sleeve on an intake rack bar blade 14 such that the blade 14 is surrounded by the sleeve 20. For example, the trailing side 28 of the sleeve may include a projection formed extending from one of the side walls 24 for a sufficient distance to contact the other side wall 26. The projection is angled on the outer surface thereof to facilitate mounting of the sleeve 20 on the rack blade 14.

A protective sleeve in accordance with the present invention may be made of a plastic material such as HDPE, although other appropriate durable plastic materials also may be employed. The protective sleeve may be manufactured using an extrusion process or any other appropriate process in any desired length appropriate for the intake rack system in which the protective sleeves will be used. The dimensions of the leading side 22, side walls 24 and 26, and trailing side 28 of the sleeve 20 may be selected such that the size and shape of the interior of the sleeve 20 corresponds to the intake rack blade 14 to be covered thereby such that the sleeve 20 surrounds the blade 14 and makes a positive and secure fit therewith when mounted thereon.

It should be understood that the present invention is not limited to the particular exemplary applications and embodiments illustrated and described herein.

What is claimed is:

1. An intake rack comprising:
    (a) a plurality of metal intake rack bars mounted parallel to each other and separated from each other to allow a flow of water therebetween; and
    (b) a protective sleeve mounted to each of the intake rack bars, each protective sleeve having an elongated first dimension and in cross section perpendicular to the first dimension comprising:
        (i) a leading side;
        (ii) first and second side walls extending from the leading side; and
        (iii) a trailing side extending from a one of the first or second side walls;
        wherein the leading side, the first and second side walls and the trailing side together define an inner space corresponding to the shape of the intake rack bar.

2. The intake rack of claim 1 wherein the metal intake rack bars are rectangular in cross section and wherein the first and second side walls of each protective sleeve are elongated and extend perpendicularly from the leading side thereof and wherein the trailing side of each of the protective sleeves extends perpendicularly from the one of the first or second side walls thereof such that the inner space defined by the leading side, the first and second side walls, and the trailing side of the protective sleeve is rectangular.

3. The intake rack of claim 1 wherein the leading side of each protective sleeve is thicker than the first and second side walls thereof.

4. The intake rack of claim 1 wherein an outer surface of the leading side of each protective sleeve is curved.

5. The intake rack of claim 1 wherein at least one of the first and second side walls of each protective sleeve is flexible.

6. The intake rack of claim 1 wherein the trailing side of each protective sleeve includes a structure for mounting the protective sleeve on an intake rack bar.

7. The intake rack of claim 6 wherein the trailing side of each protective sleeve includes a projection extending from the one of the first or second side walls thereof for a sufficient distance to contact the other of the first or second side walls thereof and wherein the projection is angled on the outer surface thereof.

8. The intake rack of claim 1 wherein the protective sleeve is made of a plastic material.

9. A method for protecting an intake rack having a plurality of metal intake rack bars mounted parallel to each other and separated from each other to allow a flow of water therebetween, comprising:
    mounting on each of the intake rack bars a protective sleeve having an elongated first dimension and in cross section perpendicular to the first dimension comprising:
    (a) a leading side;
    (b) first and second side walls extending from the leading side; and
    (c) a trailing side extending from a one of the first or second side walls;
    wherein the leading side, the first and second side walls and the trailing side together define an inner space corresponding to the shape of the intake rack bar.

10. The method of claim 9 wherein the metal intake rack bars are rectangular in cross section and wherein the first and second side walls of each protective sleeve are elongated and extend perpendicularly from the leading side thereof and wherein the trailing side of each of the protective sleeves extends perpendicularly from the one of the first or second side walls thereof such that the inner space defined by the leading side, the first and second side walls, and the trailing side of the protective sleeve is rectangular.

11. The method of claim 9 wherein the leading side of each protective sleeve is thicker than the first and second side walls thereof.

12. The method of claim 9 wherein an outer surface of the leading side of each protective sleeve is curved.

13. The method of claim 9 wherein at least one of the first and second side walls of each protective sleeve is flexible.

14. The method of claim 9 wherein the trailing side of each protective sleeve includes a structure for mounting the protective sleeve on an intake rack bar.

15. The method of claim 14 wherein the trailing side of each protective sleeve includes a projection extending from the one of the first or second side walls thereof for a sufficient distance to contact the other of the first or second side walls thereof and wherein the projection is angled on the outer surface thereof.

16. The method of claim 9 wherein the protective sleeve is made of a plastic material.

\* \* \* \* \*